(12) United States Patent
Tseng et al.

(10) Patent No.: US 6,351,694 B1
(45) Date of Patent: Feb. 26, 2002

(54) METHOD FOR ROBUST ESTIMATION OF ROAD BANK ANGLE

(75) Inventors: Hongtei Eric Tseng, Canton; John Yester, Bloomfield Hills; Ming Lang Kuang, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 58 days.

(21) Appl. No.: 09/761,157

(22) Filed: Jan. 16, 2001

(51) Int. Cl.$^7$ ............................................. G06F 17/00
(52) U.S. Cl. ........................... 701/1; 701/70; 180/197
(58) Field of Search .............................. 701/1, 41, 72, 701/73, 71, 70; 303/140, 146, 150, 148; 180/197

(56) References Cited

U.S. PATENT DOCUMENTS

| | | |
|---|---|---|
| 4,788,773 A | 12/1988 | Palsgard et al. |
| 5,200,896 A | 4/1993 | Sato et al. |
| 5,446,658 A | 8/1995 | Pastor et al. |
| 5,720,533 A * | 2/1998 | Pastor et al. ............... 303/147 |
| 5,723,782 A | 3/1998 | Bolles, Jr. |
| 6,195,606 B1 * | 2/2001 | Barta et al. .................. 701/70 |
| 6,223,114 B1 * | 4/2001 | Boros et al. .................. 701/70 |

* cited by examiner

*Primary Examiner*—Yonel Beaulieu
(74) *Attorney, Agent, or Firm*—Gregory P. Brown

(57) ABSTRACT

A method for determining road bank angle in vehicle includes a lateral acceleration sensor (22) that generates a first signal corresponding to lateral acceleration. A yaw rate sensor (18) generates a second signal corresponding to a yaw rate signal. A controller (14) coupled to the sensors performs the step of calculating a first bank angle estimate dependent on the first signal, calculating a second bank angle estimate dependent on the second signal, calculating a third bank angle estimate dependent on both the first and second signals, calculating a dynamic compensation factor based as a function of the first bank angle estimate, the second bank angle estimate and the third bank angle estimate, decomposing the third bank angle estimate into a plurality of third bank angle frequency layers, reducing each of the plurality of third bank angle frequency layers in response to a multiplicative factor, said multiplicative factor being a function of the dynamic compensation factor to obtain a plurality of reduced third bank angles, and calculating a final bank angle bias estimate based on a sum of the plurality of reduced third bank angles.

24 Claims, 2 Drawing Sheets

METHOD FOR ROBUST ESTIMATION OF ROAD BANK ANGLE

TECHNICAL FIELD

The present invention relates generally to a method for detecting a road bank angle being experienced by a moving vehicle. More particularly, the present invention relates to a method for detecting the road bank angle under dynamic lateral operating conditions for use in a motor vehicle having a yaw control system.

BACKGROUND

Automotive vehicles with braking systems which respond to vehicle conditions as well as driver input have been produced. For example, when a particular yaw rate is desired, as indicated by a driver's steering wheel operation, if the vehicle is not producing an adequate yaw rate, the braking system of the vehicle may compensate by altering a particular wheel's speed. This control is dependent on accurate measurement of several vehicle operating conditions. It has been observed that error can be introduced in the control system if the vehicle is operating at a bank angle. Therefore, it is desirable to determine the bias in the various operating condition signals introduced by operating at a bank angle.

U.S. Pat. No. 5,446,658 ('658) addresses the problem of estimating bank angles of a road surface. However, under various operating conditions, the system described in '658 patent does not have the ability to calculate the road surface bank angle under dynamic lateral operating conditions. Specifically, if the yaw rate for the vehicle changes by more than a predetermined threshold, the previously determined bank angle is assumed as the current bank angle. Of course, it is quite possible for a vehicle to undergo extreme bank angle variation during the period that the yaw rate is not within a predetermined threshold.

U.S. Pat. No. 6,073,065 provides a method for determining a bank angle experienced by a motor vehicle that is robust to dynamic lateral vehicle operations. However, the methodology reaches its limitation during high frequency maneuvers with simultaneous road bank variation. The estimation during dynamic maneuvers may experience some instantaneous errors.

A paper presented by Y. Fukada entitled "Estimation of Vehicle Slip-Angle With Combination Method of Model Observer and Direct Integration" presented at the International Symposium on Advance Vehicle Control in September 1998, addresses the estimation of road bank angle with vehicle slip angle. In this paper, the difference between lateral accelerometer measured on the force and tire model estimated lateral force is used to obtain the road bank angle. However, its accuracy is contingent on the accuracy of the estimated lateral tire force which, in turn depends on the estimated on the road surfaces and lateral velocity. In this approach, the lateral velocity in road bank angle estimation is believed to be, at best, a convoluted process. Also, the accuracy and robustness of such a calculation is suspected.

It would be desirable to provide a method for determining a bank angle being experienced by a motor vehicle that is robust to dynamic lateral vehicle operating conditions under a wide variety of maneuvers.

SUMMARY OF THE INVENTION

There is disclosed herein a method for detecting a bank angle experienced by a motor vehicle. The method comprises the steps of:

calculating a first bank angle estimate dependent on said first signal;

providing a second signal corresponding to a yaw rate of the vehicle;

calculating a second bank angle estimate dependent on said second signal;

calculating a third bank angle estimate dependent on both said first and second signals;

calculating a dynamic compensation factor based as a function of said first bank angle estimate, said second bank angle estimate and said third bank angle estimate;

decomposing the third bank angle estimate into a plurality of third bank angle frequency layers;

reducing each of the plurality of third bank angle frequency layers in response to a multiplicative factor, said multiplicative factor being a function of said dynamic compensation factor to obtain a plurality of reduced third bank angles;

calculating a final bank angle bias estimate based on a sum of the plurality of reduced third bank angles.

It is an object of the present invention to provide a method for detecting a bank angle experienced by a vehicle while undergoing transient lateral operation.

Other objects and features of the present invention will become apparent when viewed in light of the detailed description of the preferred embodiment when taken in conjunction with the attached drawings and appended claims.

DESCRIPTION OF THE PREFERRED EMBODIMENT

A method according to the present invention is intended for use with yaw control systems which are typically implemented with electronically controlled hydraulically actuated or electrically actuated braking systems in automotive vehicles, however, the invention could easily be adapted for use in yaw control systems on other motor vehicles, such as watercraft and aircraft as well as on other vehicle systems, such as active tilt or active suspension where it would be desirable to know the underlying road bank angle.

Figure 1:
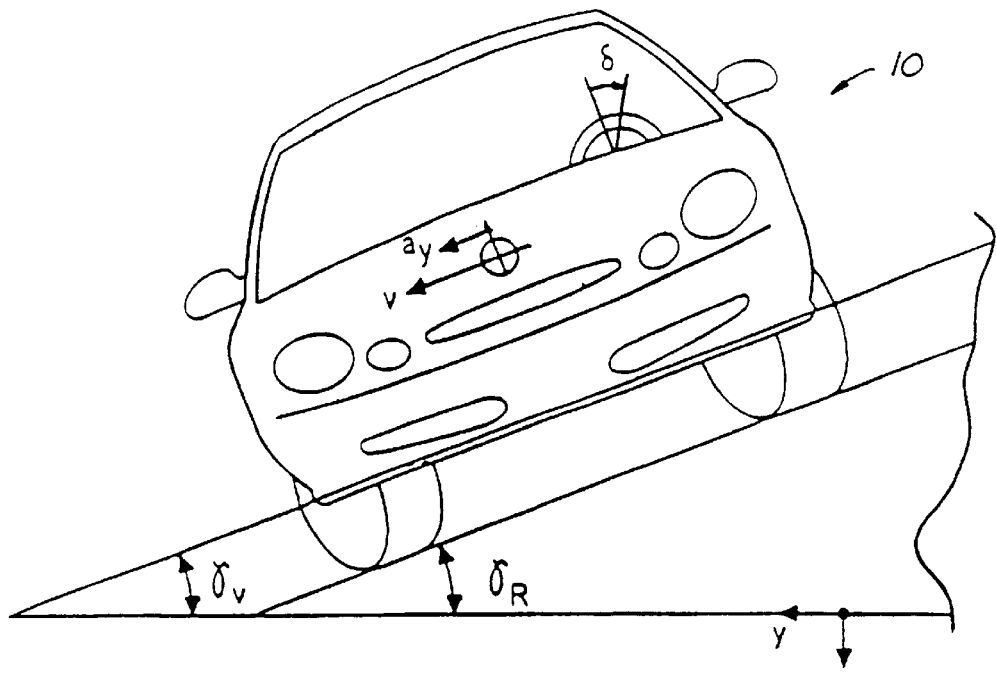
FIG. 1 is a front view of a motor vehicle illustrating various operating parameters of a vehicle experiencing a turning maneuver on a banked road surface.
Figure 2:
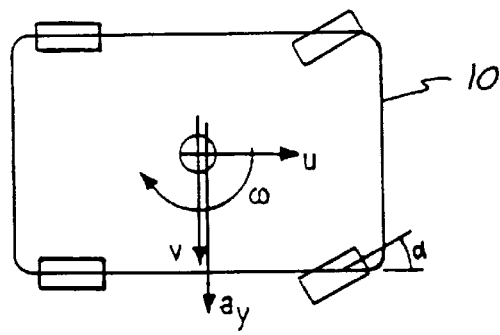
FIG. 2 is a top view of a motor vehicle illustrating various operating parameters of a vehicle experiencing a turning maneuver on a banked road surface.

Referring now to FIGS. 1 and 2, various operating parameters and variables used by the present invention are illustrated as they relate to the application of the present invention to a ground based motor vehicle 10. Those skilled in the art will immediately recognize the basic physics represented by these illustrations, thereby make the adaptation to different types of vehicles easily within their reach. These parameters will be described in greater detail below.

Figure 3:
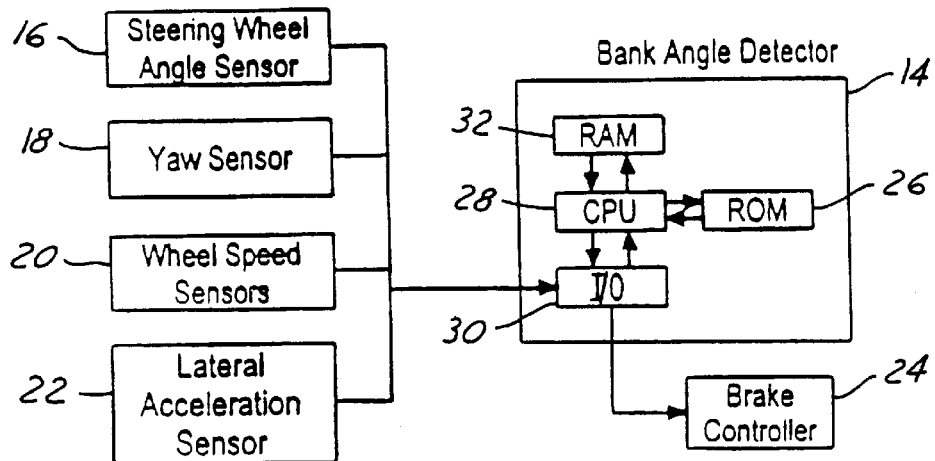
FIG. 3 is a block diagram showing a portion of a microprocessor interconnected to sensors and controlled devices which may be included in a system according to the present invention.

FIG. 3 illustrates the component parts of a system in which the present invention has been implemented successfully. Accordingly, a control module 14 receives inputs from steering wheel angle sensor 16, yaw sensor 18, wheel speed sensors 20 and lateral acceleration sensor 22. Although not illustrated, other sensors and accelerometers could be employed in addition to, or as substitutes for those illustrated, depending upon the system being controlled and the available system sensor set while still making use of the present invention. As an example, the present invention could be carried out with equivalent operability and functionality using data to generate estimates of yaw rate and lateral acceleration if the cost, complexity or other considerations made it worthwhile to eliminate the actual sensors.

As previously noted, an exemplary application of the present invention includes a braking system having active yaw control capability. For instance, a vehicle equipped with an active yaw control capable electronically controlled hydraulic braking system would include a hydraulic control unit operatively connected to brake actuators in cooperation with wheel and tire assemblies. The hydraulic control unit and brake actuators may be constructed in a known manner such as that commonly employed on Ford Motor vehicles equipped with ABS brakes in use today.

Those skilled in the art will appreciate in view of this disclosure that wheel speed sensors 20 could comprise any of a variety of devices or systems employed in automotive vehicles for determining individual wheel speeds as well as a longitudinal velocity of the vehicle. One type of automotive speed sensor suitable for use with the present invention comprises a speed module for receiving input from multiple wheel speed sensors adapted to indicate the speed of the individual wheels. The speed module derives a longitudinal vehicle speed signal by combining the signals from the individual wheel speed sensors. One such type of speed signal module is embodied in brake control modules presently used in Ford Motor Company vehicles. The individual wheel speeds are ascertained using pulse generators disposed at each wheel.

The control module 14 may output commands to a brake controller 24 which directly commands the hydraulic control unit and indirectly controls the individual brake actuators. Those skilled in the art will appreciate in view of this disclosure that a processor within the control module and its associated peripheral equipment could be structured according to several different architectures. In a preferred embodiment, however, the processor is configured so that a control program is sequentially read for each unit command from a read-only memory (ROM) 26 which stores preset control programs. Unit commands are executed by a central processing unit (CPU) 28. The processor integrally includes an input-output control circuit (I/O) 30 for exchanging data with external devices and a random access memory (RAM) 32 for temporarily holding data while the data are being processed.

Referring back now to FIGS. 1 and 2, the present invention determines an estimate of the vehicle bank angle, $\gamma_v$, which represents the sum of the vehicle tilt, due to suspension compliance, and a road bank angle, $\gamma_R$. This is accomplished by using three separately derived bank angle estimates to determine a bias created due to lateral dynamics. One of the bank angle estimates is then compensated in accordance with this bias and then used as the final bank angle estimate, $\gamma_{final}$. By compensating the bank angle estimate in this manner, the bank angle can be accurately estimated for most dynamic lateral conditions a vehicle will encounter in a controlled situation, improving the overall yaw control performance in common dynamic lateral events.

First, the principles of the present invention will be described so that it can be readily adopted to other types of vehicles. Using equations of motion for a rigid body the following relationship can be obtained:

$$a_y = u\omega + \dot{v} - g \sin(\gamma_v)$$

where:
  $a_y$=lateral acceleration measured by an accelerometer on the vehicle;
  u=longitudinal velocity of vehicle;
  $\omega$=yaw rate;
  $\dot{v}$=time derivative of the lateral velocity;
  g=gravitational constant; and
  $\gamma_v$=vehicle bank angle.

From this, if we assume that the time derivative of the lateral velocity, $\dot{v}$, is approximately zero, we can set $$\sin \hat{\gamma}_v = \frac{a_y - uw}{g}$$

We note that there will be error, primarily due to leaving $\dot{v}$ out, however, the vehicle bank angle estimate, $\hat{\gamma}_v$, will be valid when $\dot{v}$ would otherwise be zero, e.g., lateral dynamics are steady state. This is what others have done, particularly the '658 reference.

To provide greater accuracy in determining a bank angle estimate when the lateral dynamics are not steady state, the bias introduced by this assumption must be considered.

Figure 4:
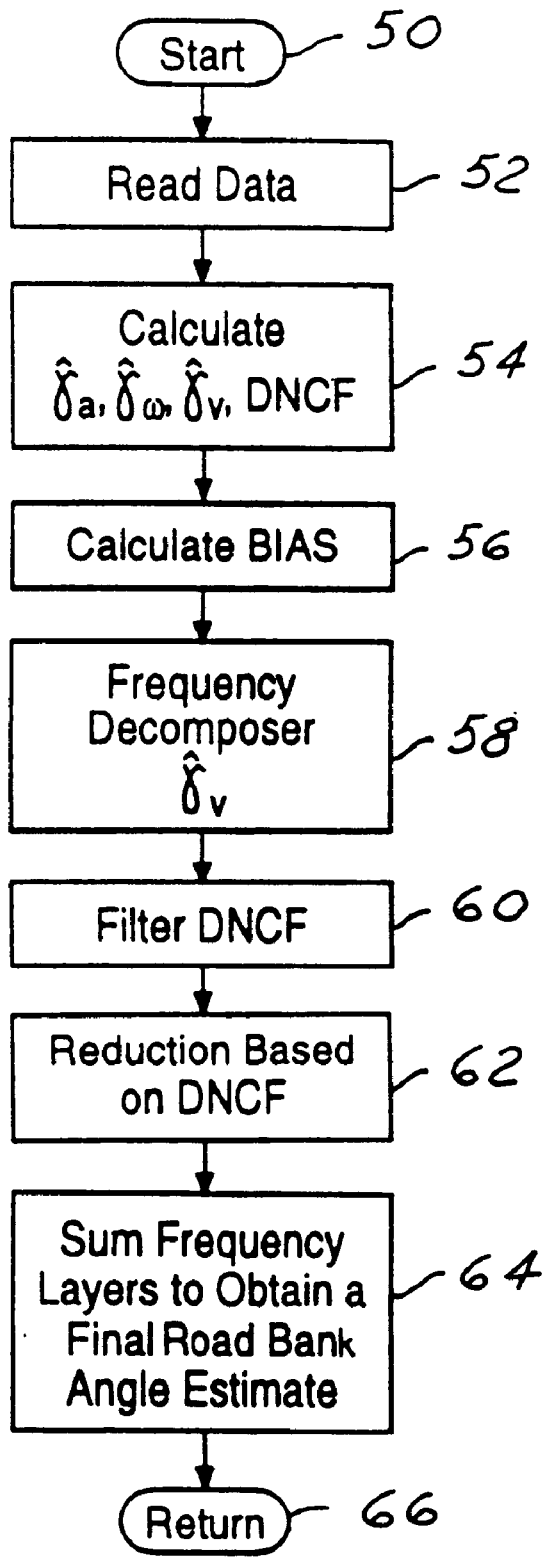
FIG. 4 is a logic flow block diagram in accordance with the present invention.

Turning now to FIG. 4, a logic flow block diagram capable of taking this bias into account in determining an estimate of the vehicle bank angle is shown and will now be further explained. At block 50 the processor starts the illustrated logic flow block diagram when the operator keys on the vehicle ignition. The processor then moves to block 52 where parameters and operating conditions of the vehicle are updated from various sensors, where the various sensors are read and their data input to the processor. If this is the first time through the algorithm all of the variables are initialized with predetermined values. The processor then steps to block 54 where three unique estimates of the vehicle bank angle, $\hat{\gamma}_a$, $\hat{\gamma}_\omega$ and $\hat{\gamma}_v$, are determined.

The first bank angle estimate, $\hat{\gamma}_a$, is determined using measured or estimated lateral acceleration data according to the following relationship:

$$\hat{\gamma}_a = A_1^{-1}(a_y - A_2 \delta)$$

where:
  $\hat{\gamma}_a$=a bank angle estimate based on measured lateral acceleration;
  $A_1$=a transfer function relating bank angle to vehicle lateral acceleration, where:

$$A_1 = \frac{-gL}{(L + Ku^2)}$$

$A_2$=a transfer function relating steering wheel angle to vehicle lateral acceleration, where:

$$A_2 = \frac{Gu^2}{L + Ku^2}$$

G=steering ratio relating actual tire angle, $\alpha$, to steering wheel angle, $\delta$;
  K=calibrated coefficient related to specific vehicle handling characteristics; and δ=steering wheel angle.

The second bank angle estimate, $\hat{\gamma}_\omega$, is determined using measured or estimated yaw rate data according to the following relationship:

$$\hat{\gamma}_\omega = B_1^{-1}(\omega - B_2 \delta)$$

where:

$\hat{\gamma}_\omega$=bank angle estimate based on measured yaw rate;

$B_1$=a transfer function relating bank angle to vehicle yaw rate, where:

$$B_1 = \frac{gKu}{(L + Ku^2)}$$

$B_2$=a transfer function relating steering wheel angle to vehicle yaw rate, where:

$$B_2 = \frac{Gu}{(L + Ku^2)}$$

The third bank angle estimate, $\hat{\gamma}_v$, is determined using measured or estimated lateral acceleration and yaw rate data in a rearranged version of Equation 2 from above, as follows:

$$\hat{\gamma}_v = \sin^{-1}\left[\frac{1}{g}(a_y - u\omega)\right]$$

where:

$\hat{\gamma}_v$=vehicle bank angle estimate based on measured lateral acceleration and yaw rate data based on the simplified equation of motion.

Once the processor has the three estimates from above, it proceeds to block 56 and calculates the bank angle BIAS due to the lateral dynamics. The processor determines the BIAS by the following equation:

$$BIAS = |DNCF| + \left|\frac{d\hat{\gamma}_v}{d_t}\right|$$

where:

DNCF=a dynamics compensation factor, which is generally a function of the three estimates and the longitudinal velocity, which may take the following form:

$$DNCF = A_1(\hat{\gamma}_a - \hat{\gamma}_v) + (\hat{\gamma}_\omega - \hat{\gamma}_v); \text{ and}$$

$\frac{d\hat{\gamma}_v}{dt}$ = a numerically estimated time rate of change of the third bank angle estimate.

The processor then proceeds to block 58 where BIAS is used to account for the error introduced from simplifying Equation 1 into Equation 2. Together, DNCF and $$\frac{d\hat{\gamma}_v}{dt}$$

account for how much change in lateral dynamics, or $\dot{v}$, the vehicle may be experiencing.

In step 58, the frequencies of the third bank angle estimate is decomposed into a plurality of frequency layers. The number of layers depends on many things including the desired accuracy and system to which it is applied. In one constructed embodiment, three frequency layers were used.

In step 60, the DNCF is filtered to obtain a frequency layer dynamic compensation factor corresponding to each of the frequency layers of the third bank angle determined in step 58. The decomposed frequency bank angles of each layer is subject to a reduction in step 62 based on a multiplicative factor between zero and 1 that is a function of the dynamic compensation factor. The multiplicative factor in each layer is chosen to remove bias in that layer. The filtering of step 60 may, for example, be low pass filtering selected for the frequency ranges of decomposition performed in step 58. The step 62 may further comprise the determination and use of the rate of change for the third bank angle estimate, $\vartheta_v$.

In step 64, the frequency layer reductions of step 62 are summed together in step 64 to form a final road bank angle estimate. By performing a reduction based on the dynamic compensation factor, a more accurate estimation of road bank angle may be determined. Such a determination is believed to be extremely useful in maneuvers even on snow and ice while avoiding false or nuisance activation on a banked road.

The processor then proceeds to block 64 and outputs the final bank angle estimate to the brake controller 24 so that adjustments can be made in the control calculations. Finally, the processor returns through block 66 to block 52, where it will repeat the bank angle estimation process until the vehicle ignition is turned off.

Various modifications will no doubt occur to those skilled in the arts to which this invention pertains. For example, the particular sensors used in conjunction with the disclosed method may be varied from those herein, as there are numerous possible methods for measuring or estimating the longitudinal velocity, yaw rate and lateral acceleration of a vehicle. Additionally, the method may be practiced with significant changes to the various transfer functions described above while remaining within the calculational and logic flow scheme described herein. Finally, it should be noted that if one desires an estimate of the lateral dynamics of equation 1v., it can be calculated using the final bank angle estimate. These and all other variations which basically rely on the teachings to which this disclosure has advanced the art are properly considered within the scope of this invention as defined by the appended claims.

While particular embodiments of the invention have been shown and described, numerous variations alternate embodiments will occur to those skilled in the art. Accordingly, it is intended that the invention be limited only in terms of the appended claims.

What is claimed is:

1. A method of detecting a bank angle for use in a yaw control system for a motor vehicle, said method comprising the steps of:
   providing a first signal corresponding to a lateral acceleration of the vehicle;
   calculating a first bank angle estimate dependent on said first signal;
   providing a second signal corresponding to a yaw rate of the vehicle;
   calculating a second bank angle estimate dependent on said second signal;
   calculating a third bank angle estimate dependent on both said first and second signals;
   calculating a dynamic compensation factor based as a function of said first bank angle estimate, said second bank angle estimate and said third bank angle estimate;

decomposing the third bank angle estimate into a plurality of third bank angle frequency layers;

reducing each of the plurality of third bank angle frequency layers in response to a multiplicative factor, said multiplicative factor being a function of said dynamic compensation factor to obtain a plurality of reduced third bank angles;

calculating a final bank angle bias estimate based on a sum of the plurality of reduced third bank angles.

2. The method according to claim 1, further comprises the steps of:

providing a third signal responsive to a sensed steering wheel angle of the vehicle;

providing a fourth signal responsive to a vehicle longitudinal speed; and calculating said first and second bank angle estimates using said third and said fourth signals.

3. The method according to claim 1, wherein said second signal corresponding to said yaw rate of said motor vehicle is determined using yaw rate sensor.

4. The method according to claim 1, wherein said second signal corresponding to said yaw rate of said motor vehicle is determined using a global positioning system.

5. The method according to claim 1, wherein said second signal corresponding to said yaw rate of said motor vehicle as a function of using wheel speed data.

6. The method according to claim 1, wherein said first signal corresponding to said lateral acceleration of said motor vehicle is determined using a lateral acceleration sensor.

7. The method according to claim 1, wherein said first signal corresponding to said lateral acceleration of said motor vehicle is determined using a GPS global positioning system.

8. The method according to claim 1, wherein said first signal corresponds to said lateral acceleration of said motor vehicle which is determined using a longitudinal velocity and a steering wheel angle.

9. The method according to claim 1, wherein said multiplicative factor may be characterized as a function output value having a range of between zero and one.

10. The method according to claim 1, further comprising the step of determining the multiplicative factor by determining a rate of change for said third road bank estimate.

11. The method according to claim 1, further comprising the step of determining the multiplicative factor by filtering said dynamic compensation factor.

12. The method according to claim 1, wherein the step of reducing comprises the step of reducing each of the plurality of third bank angle frequency layers in response to the multiplicative factor being a function of said dynamic compensation factor and said rate of change for said third road bank estimation.

13. The method according to claim 1, further comprising the step of estimating the lateral dynamics of the vehicle using the final road bank angle.

14. A method of detecting a bank angle for use in a yaw control system for a motor vehicle, said method comprising the steps of: providing a first signal corresponding to a lateral acceleration of the vehicle;

providing a second signal corresponding to a yaw rate of the vehicle;

providing a third signal responsive to a sensed steering wheel angle of the vehicle;

providing a fourth signal corresponding to a vehicle speed;

calculating a first bank angle estimate dependent on said first signal, said second signal, and said fourth signal;

calculating a dynamic compensation factor in response to said first signal, said second signal, said third signal and said fourth signal;

decomposing the first bank angle estimate into a plurality of bank angle frequency layers;

reducing each of the plurality of bank angle frequency layers using a multiplicative factor, said multiplicative factor being a function of said dynamic compensation factor to obtain a plurality of reduced bank angles;

calculating a final bank angle estimate based on a sum of the plurality of reduced bank angles.

15. The method according to claim 14, wherein said second signal corresponding to said yaw rate of said motor vehicle is determined using wheel speed data.

16. The method according to claim 14, wherein said first signal corresponding to said lateral acceleration of said motor vehicle is determined using a longitudinal velocity and a steering wheel angle.

17. The method according to claim 14, wherein said function may be characterized as a function output value having a range of between zero and one.

18. The method according to claim 14, wherein said second signal corresponds to said yaw rate of said motor vehicle is determined using a yaw rate sensor.

19. The method according to claim 14, wherein said first signal corresponds to said lateral acceleration of said motor vehicle and is determined using a lateral acceleration sensor.

20. The method according to claim 13, further comprising the steps of calculating a second bank angle estimate dependent on said first signal, said third signal, and said fourth signal;

calculating a third bank angle estimate dependent on said second signal, said third signal, and said fourth signal; and calculating a dynamic compensation factor as a function of said first bank angle, said second bank angle and said third bank angle.

21. The method according to claim 20, further comprising the step of determining the multiplicative factor by determining a rate of change for said first road bank estimation.

22. The method according to claim 20, further comprising the step of determining the multiplicative factor by filtering said dynamic compensation factor.

23. The method according to claim 20, wherein the step of reducing comprises the step of reducing each of the plurality of bank angle frequency layers in response to a multiplicative factor being a function of said dynamic compensation factor and said rate of change for said first road bank estimation.

24. A system for controlling a vehicle comprising:

a lateral acceleration sensor generating a first signal corresponding to a lateral acceleration of the vehicle;

a yaw rate sensor generating a second signal corresponding to a yaw rate of the vehicle;

a controller coupled to said lateral acceleration sensor and said yaw rate sensor, said controller calculating a first bank angle estimate dependent on said first signal, calculating a second bank angle estimate dependent on said second signal, calculating a third bank angle estimate dependent on both said first and second signals, calculating a dynamic compensation factor based as a function of said first bank angle estimate, said second bank angle estimate and said third bank angle estimate, decomposing the third bank angle estimate into a plurality of third bank angle frequency layers, reducing each of the plurality of third bank angle frequency layers in response to a multiplicative factor, said multiplicative factor being a function of said dynamic compensation factor to obtain a plurality of reduced third bank angles, and calculating a final bank angle bias estimate based on a sum of the plurality of reduced third bank angles.

* * * * *